May 14, 1957  A. M. GUREWITSCH ET AL  2,792,484
TEMPERATURE MEASURING AND CONTROLLING APPARATUS
Filed Dec. 19, 1951  2 Sheets-Sheet 1
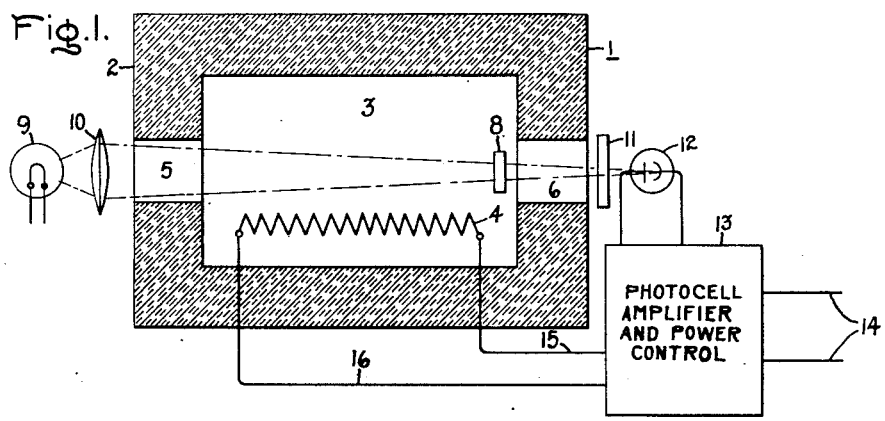
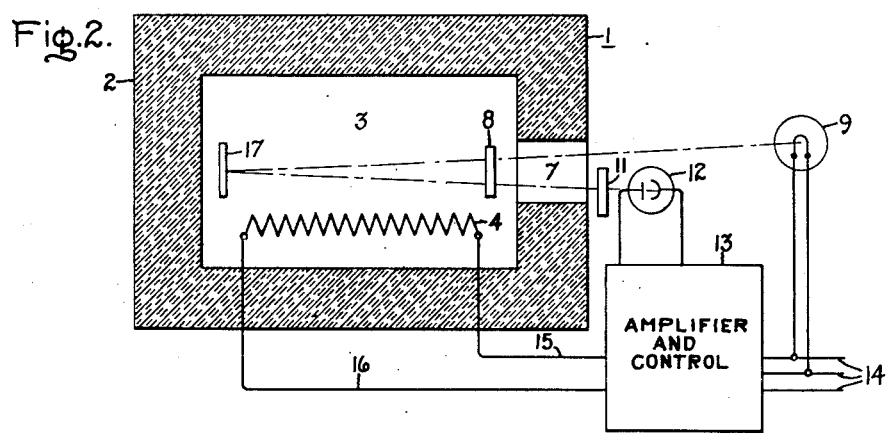
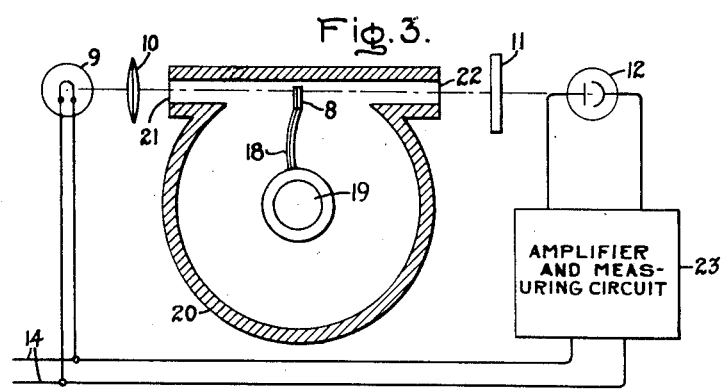
Inventors:
Anatole M. Gurewitsch,
William C. Dunlap, Jr,
by Paul A. Frank
Their Attorney.

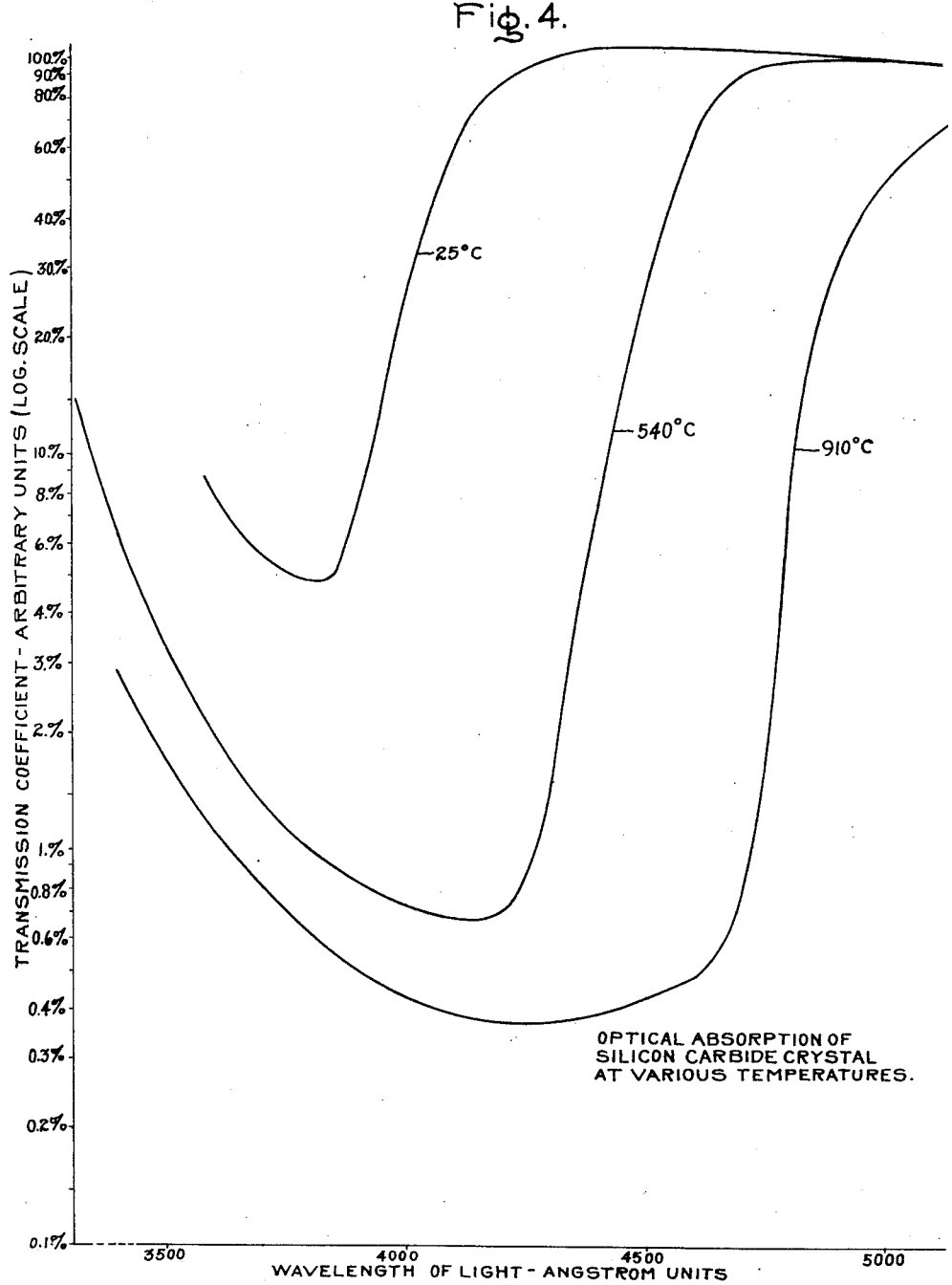

United States Patent Office 2,792,484
Patented May 14, 1957

2,792,484

TEMPERATURE MEASURING AND CONTROLLING APPARATUS

Anatole M. Gurewitsch and William C. Dunlap, Jr., Schenectady, N. Y., assignors to General Electric Company, a corporation of New York Application December 19, 1951, Serial No. 262,426

7 Claims. (Cl. 219—20)

Our invention relates to a method and apparatus for measuring temperature, which may also be used to control temperature if desired. More particularly, our invention relates to a temperature measuring method or apparatus using as its temperature sensitive element certain crystals which have the property of changing their light absorption characteristics in response to changes in temperature of the crystals. Extreme sensitivity may be obtained in methods or apparatus using such crystals, and the invention further has the advantage of being usable to measure temperatures extending from very low (—60° C.) to very high (1000° C.). When properly used, precise measurement and control of temperature may be obtained by the invention when it is impossible or undesirable to make mechanical or electrical connection to the article or space, the temperature of which is concerned. Therefore, our invention may be used to measure temperatures in corrosive atmospheres or on moving objects.

The principal objects and advantages of our invention are obtained by placing a temperature-responsive-light-obsorption-changing crystal in or on the area concerned, by directing light through the crystal, and by utilizing that portion of the light which passes through the crystal to measure the temperature of the crystal or to actuate a control in response to the temperature. A standard photoelectric cell, which may be a photomultiplier tube, can be used to detect variations in the transmitted light. Other objects and further details of that which we believe to be novel and our invention will be clear from the following description and claims taken with the accompanying drawings in which are illustrated several examples of apparatus embodying the present invention and incorporating a temperature - responsive - light - absorption - changing crystal.

In the drawing, Fig. 1 is a schematic view of an electric furnace and a control therefor, wherein light is passed through the furnace from one side to the other; Fig. 2 is a similar schematic view of a modified form of control wherein light does not pass through more than one wall of the furnace; Fig. 3 is a schematic representation of a temperature-measuring arrangement used with an enclosed rotor or similar moving object, and Fig. 4 is a graph showing the optical absorption of a silicon carbide crystal at various temperatures, this crystal being the one preferred for use by us in a method or apparatus according to our invention.

Our invention will first be described in connection with the control of temperature in an electric furnace 1 having the usual walls 2 of refractory material and an interior 3 suitably heated as by an electrical resistance element 4. In the device shown in Fig. 1, the furnace has openings 5 and 6 in opposite walls of the furnace so that light may pass therethrough for purposes to be later described. In the furnace of Fig. 2, there is a single opening 7 in a wall of the furnace for the passage of light.

As explained above, the temperature-sensitive element which is used to measure or to measure and control the temperature within the furnace is a crystal 8, which is located within the furnace in the space or area where the temperature is to be measured. The crystal is left in place long enough to approach the temperature of the furnace. This crystal must exhibit the property of changing its light absorption characteristics in response to changes of temperature. The best example of a crystal known to us which exhibits the desired characteristics is a transparent crystal of silicon carbide. We have found that the effects desired are readily apparent within the temperature range of from 0 to 100° C., and can be used as high as 1000° C. and possibly higher. The graph of Fig. 3 shows the change in optical absorption of silicon carbide crystals tested at 25° C., at 540° C., and at 910° C.

Other tests indicate that useful changes in the optical transmission characteristics of silicon carbide crystals are present at temperatures as low as 35° below zero (centigrade) and less. In one test where light of 4050 Angstrom units was directed through a silicon carbide crystal which was held at various test temperatures and the light transmitted through the crystal was directed to the sensitive element of a photocell, regular changes in output of the photocell were observed of from about 420 microamperes with the crystal at 60° below zero to about 10.5 microamperes with the crystal at 300° above zero. This variation in response of the photocell, produced by changes in light transmission of the crystal at the various temperatures, is ample for measurement or control of temperatures in this range, using commercially practicable apparatus and techniques.

Besides silicon carbide, other substances, including cadmium sulfide, silver iodide, cuprous iodide and mixed crystals of these substances, exhibit the desired characteristics. By proper selection of crystals, desired response to different temperatures may be obtained for a variety of wavelengths of light.

In the arrangement shown in Fig. 1, it will be noted that the crystal 8 is not only within the furnace, but is also within a beam of light which passes from the opening 5 to the opening 6 in the furnace walls, a lamp 9 with a focusing lens 10 being used to produce the light beam. After passing through the crystal 8 and through the opening 6, the light beam may be filtered as at 11 before it strikes the photoelectric cell 12, which is used as the measuring or control element. The photoelectric cell is connected to an amplifier and a suitable electrical control which is actuated by the amplifier, the amplifier and control being indicated generally by the Figure 13 in the drawing and being constructed in any approved conventional fashion.

The amplifier and control system is set up so as to require a certain amount of light energy to come to the photocell. If not enough energy arrives, the amplifier will open the power control and interrupt the power circuit 14, which goes through the control 13 to electrical leads 15 and 16 which are connected to the heating element 4 within the furnace. Depending upon the temperature of the crystal 8, the light energy reaching the cell 12 will vary and this variation is used to turn the circuit to the heating element of the furnace on or off.

The arrangement shown in Fig. 2 is slightly different. In this form, the lamp 9 sends a beam of substantially constant intensity through the opening 7 in the furnace wall, where it passes through the crystal 8, into the space 3 in the furnace, is reflected by the mirror 17 so that it again passes through the space 3 of the furnace and through the crystal 8, and opening 7, but in its reflected path the light beam does not return to the lamp but passes through a filter 11 to photocell 12. The control of the heating element is obtained as before. The positions of the lamp and crystal may be arranged to pass light only once through the crystal, if desired.

The arrangement of Fig. 3 is shown in connection with the measurement of temperature of a rotating element 18 spinning on an axis 19 within an enclosure 20. The crystal 8 is mounted at the tip of the rotating element 18 in the casing or housing 20. As with the device of Fig. 1, light from a lamp 9 focused by a lens 10 is directed through openings 21 and 22 in the casing 20 and each time the crystal 8 passes between the openings, light will be intercepted and absorbed to some degree by the crystal 8 depending upon its temperature. The remaining light may be filtered as by the filter 11 before it reaches the photoelectric cell 12 and the energy received by the cell amplified and measured in any suitable way by an amplifying meter indicated as at 23. Obviously, a pulsating response will be obtained, and variations in the amplitude of the pulses will be significant. The temperature of rapidly moving turbine buckets or similar objects may be measured by the arrangement illustrated schematically in Fig. 3.

A great advantage of our method and apparatus over those of conventional radiation pyrometry lies in the sensitivity of the crystals to temperatures considerably below a red heat. As shown in the graph of Fig. 4, the absorption characteristics change markedly and regularly for temperatures very close to room temperature. It will be noted that the greatest and most rapid change in transmission characteristics of the crystal at 25° C. occurs in the violet range between about 3900 Angstrom units and 4300 Angstrom units. At 540° C., the curve is steepest between about 4200 Angstrom units and 4700 Angstrom units. At 910° C., there is a similar large and rapid change in transmission coefficient with light having wavelengths between about 4600 and 5400 Angstrom units. By proper selection of crystals and filters, and by adjustment of the measuring or control circuits, response may be obtained accurately at almost any desired temperature. By using monochromatic light which can be easily obtained with a tungsten lamp and ordinary glass filters, a certain region of the spectrum may be selected, and this region will correspond to a certain temperature of the crystal involved. Thus, the photo cell control can be set to respond only when light of the proper wavelength has been either cut out or built up to the desired extent. Because of the very sharp edge or abrupt change in the light absorption characteristic of the crystals at certain particular temperatures, use of monochromatic light is especially attractive for high precision measurement or control.

Although we have shown control of an electrically heated furnace by our apparatus and method, it is clear that furnaces heated by oil, gas or other means may be similarly controlled, by having the photocell operate conventional control mechanisms now usually actuated by a thermostat.

As will be evident from the foregoing description, certain aspects of our invention are not limited to the particular details of construction of the examples illustrated, and we contemplate that various and other modifications and applications of the invention will occur to those skilled in the art. It is therefore our intention that the appended claims shall cover such modifications and applications as do not depart from the true spirit and scope of our invention.

What we claim as new and desire to secure by Letters Patent of the United States is:

1. Apparatus for the continuous measurement of temperature comprising, a source of light independent of the temperature to be measured, a transparent inorganic crystal having continuously-varying temperature-dependent light transmitting characteristics over a substantial range of temperatures, said crystal being located in a place the temperature of which lies within said range and is to be measured, a filter having substantially the same color as said crystal when said crystal is at a temperature within said range, means directing light from said source through said crystal and said filter, and means including a light sensitive element for metering light transmitted through said crystal and said filter.

2. Temperature control apparatus comprising a heating element, a light source of substantially constant intensity independent of the temperature to be controlled, a transparent inorganic crystal having continuously-varying temperature-dependent light transmitting characteristics at different temperatures over a substantial range of temperatures, said crystal being located in an area heated by said element, means directing light from said source upon and through said crystal, a light sensitive element responsive to light energy transmitted through said crystal, and a control for said heating element actuated by said light sensitive element.

3. Apparatus for the measurement of temperature of a moving object, which apparatus comprises a source of substantially monochromatic light independent of the temperature to be measured, a transparent cadmium sulfide crystal having continuously-varying light transmitting characteristics at temperatures over a substantial range of adjacent different temperatures, said crystal being in thermal contact with said moving object, means directing light from said source through the path of movement of said crystal and means including a light sensitive element for metering light transmitted through said crystal.

4. Temperature control apparatus comprising a power source, a heating element energized by said power source, a light source independent of the temperature to be controlled, a transparent inorganic crystal having continuously-varying light transmitting characteristics at different temperatures over a substantial range of temperatures, said crystal being located in an area heated by said heating element to a temperature within said range, a filter having substantially the same color as said crystal when said crystal is at a temperature within said range, means directing light from said light source through said crystal and said filter, a light sensitive element responsive to light energy transmitted through said crystal and said filter, and means responsive to said light sensitive element for controlling the energization of said heating element by said power source.

5. Apparatus for the control of an electric furnace comprising a heating element for the furnace, a power supply to said heating element, a lamp directing light in a beam into said furnace, a transparent crystal of silicon carbide in said furnace in said beam of light, said crystal having the property of changing its light transmitting characteristics in response to changes in temperature, a photoelectric cell located to receive light transmitted through said crystal, and a control for said power supply to said heating element actuated by said photoelectric cell.

6. Apparatus for the continuous measurement of temperature comprising, a source of substantially constant and monochromatic light independent of the temperature to be measured, a transparent cadmium sulfide crystal having continuously-varying temperature-dependent light transmitting characteristics at different temperatures over a substantial range of temperatures, said crystal being located in a place the temperature of which lies within said range and is to be measured, means directing light from said source upon said crystal, and means including a light sensitive element for continuously metering light transmitted through said crystal.

7. Apparatus for the control of a furnace comprising a heating element for the furnace, a power supply to said heating element, a lamp directing light in a beam into said furnace, a transparent crystal of cadmium sulfide in said furnace in said beam of light, said crystal having the property of changing its light transmitting characteristics in response to changes in temperature, a photoelectric cell located to receive light transmitted through said crystal, and a control for said power supply to said heating element actuated by said photoelectric cell.

(References on following page)

References Cited in the file of this patent

UNITED STATES PATENTS

| | | |
|---|---|---|
| 1,362,281 | Bash | Dec. 14, 1920 |
| 1,419,725 | Fisher | June 13, 1922 |
| 1,623,666 | Ferkel | Apr. 5, 1927 |
| 1,676,536 | Ferkel | July 10, 1928 |
| 1,881,616 | Ives | Oct. 11, 1932 |
| 2,103,623 | Kott | Dec. 28, 1937 |
| 2,239,452 | Williams et al. | Apr. 22, 1941 |
| 2,335,659 | Fraenckel et al. | Nov. 30, 1943 |
| 2,341,295 | Shobert | Feb. 8, 1944 |
| 2,359,787 | Peters et al. | Oct. 10, 1944 |
| 2,404,147 | Strickland | July 16, 1946 |
| 2,411,672 | Van Den Akker | Nov. 26, 1946 |
| 2,462,823 | Woodward | Feb. 22, 1949 |
| 2,466,696 | Friswold et al. | Apr. 12, 1949 |
| 2,666,583 | Whitney | Jan. 19, 1954 |

OTHER REFERENCES

Mellor: Treatise on Inorganic and Theoretical Chemistry; vol. 5, p. 881; 1924; Longmans, Green Co.

Analytical Absorption Spectroscopy, Text by Mellon 1950, pages 249, 250, published by John Wiley & Sons Inc., New York.